Figure 1:
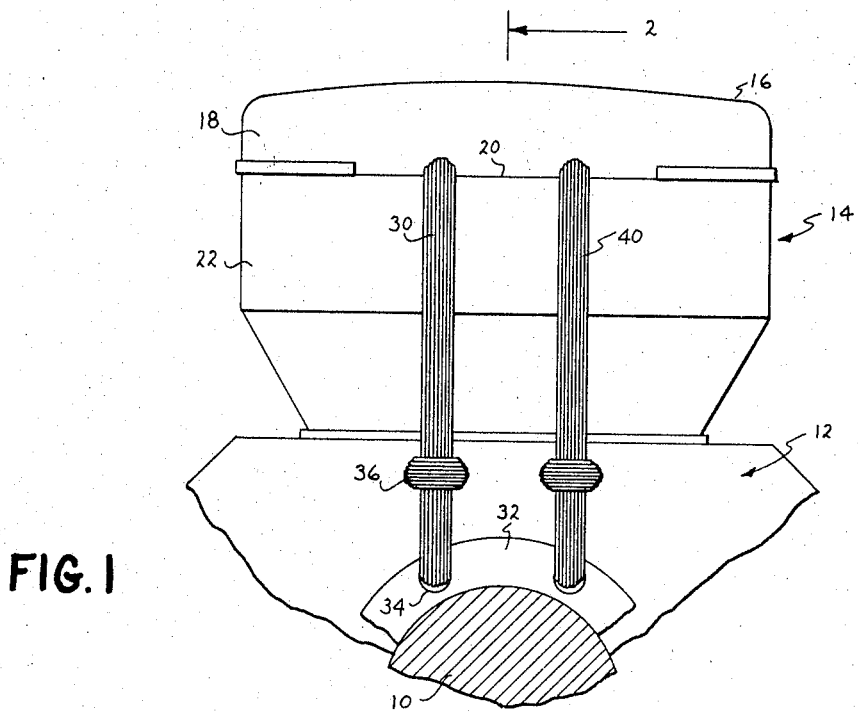

April 8, 1969  K. G. SEELIGER ET AL  3,437,857
SALIENT FIELD POLE HAVING RADIAL AIR DUCTS BETWEEN END TURN LAYERS
Filed Oct. 14, 1966

INVENTORS
KURT G. SEELIGER
CARLETON L. STRUNK
BY
*James C. Davis Jr.*
THEIR ATTORNEY United States Patent Office 3,437,857
Patented Apr. 8, 1969

3,437,857
SALIENT FIELD POLE HAVING RADIAL AIR
DUCTS BETWEEN END TURN LAYERS
Kurt G. Seeliger, Niskayuna, and Carleton L. Strunk, Schenectady, N.Y., assignors to General Electric Company, a corporation of New York
Filed Oct. 14, 1966, Ser. No. 586,801
Int. Cl. H02k 1/24
U.S. Cl. 310—180                                    8 Claims This invention pertains to dynamoelectric machines and, more particularly, relates to salient field poles used in the rotor of synchronous machines of this kind.

Synchronous machine salient rotor poles have been constructed without radial ventilation ducts in the pole winding. The winding at the pole ends was a dense mass of conductors, insulating material and bonding compounds. End turn deflection, under the influence of centrifugal force, was prevented by an L-shaped plate having the leg thereof attached to the pole body and the foot thereof extending axially over the coil end turns.

Recently, salient pole windings have been provided wherein radially extending spacers are disposed between adjacent layers of the field winding in the end turn region. This construction is characterized by radially extending cooling ducts between the spaced end turn layers. Thus, the problem arises of how to support the axially spaced layers of end turns against radial deflection without at the same time blocking or restricting the flow in the cooling ducts.

Three approaches have been suggested to provide support for ventilated field coil end turns. In the first, an L-shaped bracket is used similar to those previously employed except that the foot of the bracket is radially outwardly spaced from the coil by insulating spacers that provide axially extending exhaust ducts. The chief disadvantage is that the tortuous ventilation path substantially restricts the flow of coolant. In the second approach the customary L-shaped bracket is provided, but having a perforate foot portion. This construction is subject to misalignment of the ducts in the coils and perforations, and consequent blocking or restriction of the ducts. The third approach has been to provide radially extending studs or fingers threaded or welded to the end of the pole core adjacent the top of the pole and extending over the end turns. Because the pole is of laminated construction, studs or fingers secured to its periphery tend to depart substantially from axial alignment to an unpredictable extent when subjected to radial forces and even during fabrication of the pole, resulting in an unsatisfactory support structure in many cases.

Accordingly, it is a principal object of this invention to provide a salient pole rotor having improved support means for radially ventilated field windings.

Another object of this invention is to provide means for restraining ventilated field windings against radial deflection without substantially restricting the radial flow of coolant therethrough.

Briefly, in accord with the present invention, a rotor including salient field poles having radially ventilated field winding end turns features one or more loops of rigid insulating material extending radially through a small portion of the ventilation ducts, around the end turns and back to the rotor shaft. In this way, it has been found that a strong and reliable end turn restraint is provided which does not substantially restrict the radial flow of cooling air. In a preferred embodiment the hoop is fabricated of thermosettable resin-impregnated roving and a perforated ring is mounted on the rotor shaft to facilitate tying directly thereto.

Figure 2:
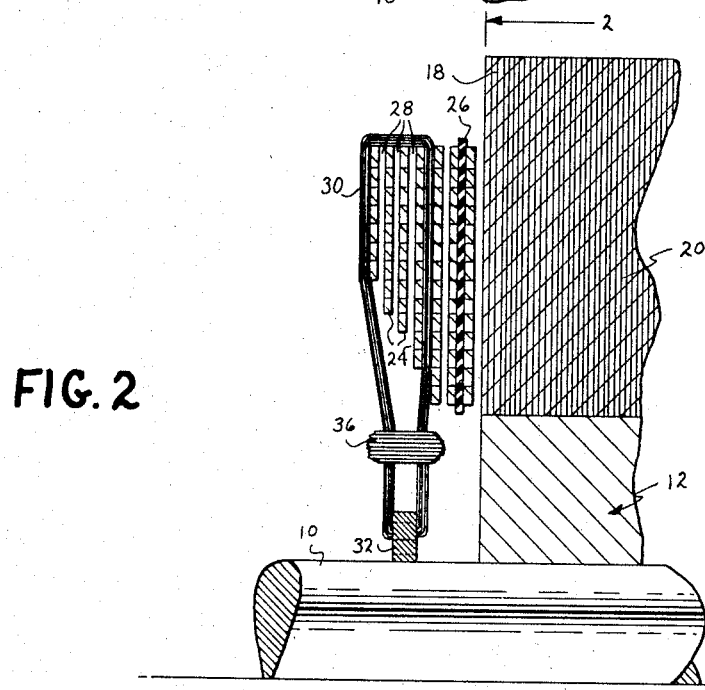

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIGURE 1 is a segmental end view of a rotor featuring an embodiment of the invention; and FIGURE 2 is a cross-sectoin view of the rotor of FIGURE 1.

The rotor partially depicted in FIGURE 1 comprises a shaft 10 carrying a spider 12 to which are affixed a plurality of circumferentially spaced salient poles, one of which is shown and designated at 14. Shaft 10 is typically journaled at opposite ends for rotation within a dynamoelectric machine frame and the outer peripheral surface 16 of pole 14 is closely spaced radially inwardly from a cylindrical stator bore so that pole 14 cooperates electromagnetically with the stator windings in a well-known manner. Pole 14 comprises a stack of ferromagnetic punchings that include a pole shoe 18 and a pole core 20, as seen in FIGURE 2, about which a field winding 22 is disposed. In common practice, the inner radial portion of core 20 is dovetail fitted, or the like, into a corresponding groove in spider 12 and the latter is, in turn, keyed to shaft 10.

In accord with the present invention, the field winding 22 end turns comprise a plurality of radially disposed conductor layers, as 24, that are axially spaced relative to each other, and the end turns are restrained in the radial direction by support means independent of mechanical attachment to core 20. While the layers 24 are depicted as consisting of single radially-extending rows of conductors, it will be appreciated that the thickness of each layer will commonly consist of a plurality of such rows. The spacing of end turn layers is advantageously achieved by sandwiching a plurality of spacer blocks, as 26, between the layers 24 during fabrication of winding 22. The spacer blocks are preferably substantially square in cross section and the spaces therebetween form ducts, as 28, that extend radially to provide ventilation paths through the end turn region. The structure described acts as a centrifugal fan itself, although other fluid circulating means can be used additionally.

The end turn restraining means comprises a continuous loop 30 of hard insulating material that extends radially through one of ducts 28, over the top of the end turn layers axially outboard of the selected duct and radially along the outer surface of the final winding layer. The radially inner portion of the loop 30 is secured to shaft 10 by wrapping thereabout, or preferably by securing to a ring 32 mounted on shaft 10 for this purpose. Ring 32 advantageously is provided with a plurality of circumferentially spaced holes or apertures, as 34, for facilitating secure connection thereto. A crosstie 36 can be employed conveniently to impart a desired amount of pretension to loop 30.

A presently preferred material for loop 30 is a resin-impregnated tape of ethylene glycol terephthalate fibers that is advantageously selected to be substantially heat shrinkable. The tape can have a nominal width of ⅜ inch and a thickness of 0.01 inch. The loop 30 can be formed conveniently by coiling a plurality of turns of such tape that in a typical case will consist of from 15 to 20 turns, for example. The resin preferably is initially viscous, or tacky, and resin of the kind described in U.S. Patent 2,747,118—Coggeshall et al. has been found to be highly advantageous. Alternatively, loop 30 can be formed of roving of the kind described in said patent. After loop 30 is formed, the resin is cured to a solid body, providing a reinforced integral loop of high tensile strength. In the case where the centrifugal force on the end turns is relatively low, for example in machines having a rotational speed less than 1000 r.p.m. it has been found that the loop need only encircle the end turns in many cases and need not be secured to the shaft.

The end turn restraint set forth has been found to provide a secure support for the end turn layers while not, at the same time, being unduly rigid to the point of overstraining the radially outer portions of the end turn layers. Thus, the support system described has the necessary elastic property to accommodate the very slight radial outward movement of the entire structure when under the influence of centrifugal forces caused by rotation.

The support loops in accord with this invention can encircle all or selected portions of the end turn layers. In general, it has been found unnecessary to encircle the axially innermost layers because of their shorter span and proximity to the pole core. Accordingly, in the preferred embodiment only the axially outermost end turn layers are encircled. This construction has the advantage of employing the loop primarily as a tension member and reducing the required hoop strength thereof. Also, the ring 32 is preferably positioned so that the portion of loop 30 extending through the duct is oriented essentially radially for maximum strength.

The foregoing is a description of an illustrative embodiment of the invention, and it is applicants' intention in the appended claims to cover all forms which fall within the scope of the invention.

What we claim as new and desire to secure by Letters Patent of the United States is:

1. A rotor for a synchronous machine comprising: a rotatable shaft; a plurality of salient field poles circumferentially spaced about said shaft for rotation therewith; field windings on said poles having axially spaced end turn layers and radially extending ventilation ducts between adjacent end turn layers; and an end turn support comprising a loop of hard insulating material encircling at least a portion of said end turn layers to provide restraint against end turn radial deflection without substantially restricting said radially extending ventilation ducts.

2. The rotor of claim 1 including a tying ring on said shaft positioned radially inwardly of said end turn layers and an aperture in the periphery of said ring, said loop passing through said aperture.

3. The rotor of claim 1 including a plurality of radially extending spacer blocks sandwiched between said end turn layers to provide said axial spacing thereof.

4. The rotor of claim 1 wherein said loop is fabricated of thermoset resin and reinforcing fibers of insulating material.

5. The rotor of claim 4 wherein said loop is continuous and lies substantially in a radial plane through the axis of said shaft.

6. The rotor of claim 1 wherein said loop encircles only a portion of the end turn layers and portion comprises the outermost layers.

7. A salient field pole for a dynamoelectric machine having a rotatable shaft, said pole comprising: field windings having axially spaced end turn layers and radially extending ventilation ducts between adjacent end turn layers; and an end turn support comprising a plurality of separate loops of reinforced thermoset resin encircling at least the axially outermost layers of said end turn layers and establishing restraint against end turn radial deflection without substantially restricting said radially extending ventilation ducts.

8. The pole of claim 7 wherein the reinforcing material in said loops consists of ethylene glycol terephthalate fibers.

References Cited

FOREIGN PATENTS 831,440  3/1960  Great Britain.

WARREN E. RAY, Primary Examiner.

R. SKUDY, Assistant Examiner.

U.S. Cl. X.R.

310—194, 269